United States Patent
Erhard et al.

(10) Patent No.: US 9,087,400 B2
(45) Date of Patent: *Jul. 21, 2015

(54) RECONSTRUCTING AN OBJECT OF INTEREST

(75) Inventors: Klaus Erhard, Hamburg (DE); Michael Grass, Buchholz in der Nordheide (DE); Thomas Buelow, Grosshansdorf (DE); Eberhard Sebastian Hansis, Menlo Park (DE)

(73) Assignee: Koninklijke Philips N.V., Eindhoven (NL)

( * ) Notice: Subject to any disclaimer, the term of this patent is extended or adjusted under 35 U.S.C. 154(b) by 37 days.

This patent is subject to a terminal disclaimer.

(21) Appl. No.: 13/515,830
(22) PCT Filed: Dec. 10, 2010
(86) PCT No.: PCT/IB2010/055714
§ 371 (c)(1),
(2), (4) Date: Jun. 14, 2012
(87) PCT Pub. No.: WO2011/073864
PCT Pub. Date: Jun. 23, 2011

(65) Prior Publication Data
US 2012/0301003 A1    Nov. 29, 2012

(30) Foreign Application Priority Data
Dec. 17, 2009  (EP) .................................... 09179718

(51) Int. Cl.
*G06K 9/00*   (2006.01)
*G06T 11/00*   (2006.01)
(52) U.S. Cl.
CPC ......... *G06T 11/006* (2013.01); *G06T 2211/436* (2013.01)
(58) Field of Classification Search
None
See application file for complete search history.

(56) References Cited

U.S. PATENT DOCUMENTS

| 2008/0123930 A1 | 5/2008 | Bernard et al. |
| 2008/0155451 A1 | 6/2008 | Lundstrom et al. |

(Continued)

FOREIGN PATENT DOCUMENTS

| WO | 2008107816 A1 | 9/2008 |
| WO | 2009083864 A2 | 7/2009 |

(Continued)

OTHER PUBLICATIONS

Benson et al, "Three-Dimensional Focus of Attention for Iterative Cone-Beam Micro-CT Reconstruction", Physics in Medicine and Biology, vol. 51, No. 18, 2006, p. 4533-4546.
Sidky et al, "Image Reconstruction in Digital Breast Tomosynthesis by Total Variation Minimization", Medical Imaging, vol. 6510, 2007, pp. 651027-1-651027-6.

*Primary Examiner* — Bhavesh Mehta
*Assistant Examiner* — Andrew Moyer

(57) ABSTRACT

A system for generating a reconstruction of an object of interest comprises a shape model generator (1) for generating a shape model representing a shape of the object in dependence on a plurality of projections of the object, and a reconstructor (2) for reconstructing the object, based on the projections, in dependence on the shape model to obtain the reconstruction of the object. The reconstructor (2) comprises a soft-tissue reconstructor (4) for generating a reconstruction favoring soft tissue, based on the plurality of projections, and a sparse reconstructor (5) for generating a reconstruction of sparse objects, based on the plurality of projections. The reconstructor (2) comprises a clipping subsystem (3) for clipping an outside of the object from the reconstruction, based on the shape model, or the reconstructor (2) is arranged for reconstructing only an inside and/or boundary of the object as defined by the shape model.

11 Claims, 3 Drawing Sheets

(56) References Cited

U.S. PATENT DOCUMENTS

| | | |
|---|---|---|
| 2009/0080752 A1 | 3/2009 | Ruth et al. |
| 2009/0087067 A1 | 4/2009 | Khorasani |
| 2009/0123052 A1 | 5/2009 | Ruth et al. |
| 2010/0098315 A1* | 4/2010 | Hansis et al. ................. 382/132 |
| 2010/0239143 A1* | 9/2010 | Griswold et al. ............ 382/131 |
| 2010/0316270 A1* | 12/2010 | Erhard et al. ................. 382/128 |

FOREIGN PATENT DOCUMENTS

| | | | |
|---|---|---|---|
| WO | 2009083866 A1 | 7/2009 | |
| WO | WO2009/083866 * | 7/2009 | ............. G06T 11/00 |

\* cited by examiner

RECONSTRUCTING AN OBJECT OF INTEREST

FIELD OF THE INVENTION

The invention relates to reconstructing an object of interest. The invention further relates to generating a tomosynthesis dataset. The invention further relates to breast tomosynthesis.

BACKGROUND OF THE INVENTION

Tomosynthesis breast imaging typically involves acquiring a plurality of tomosynthesis projection images at a series of angles relative to the breast, and using these projection images to reconstruct a volumetric tomosynthesis image. Tomosynthesis volume images can be processed by various techniques, such as CAD (computer aided detection) techniques, which draw attention to selected portions or features of these images. These techniques allow analyzing the images to identify likely abnormalities and to place markers on a breast image or a breast representation to identify a location. In some cases, the markers may further identify the type or other information of the likely abnormalities. Moreover, the tomosynthesis volume images may be displayed for inspection by a medical professional. For example, image slices or projections of the volumetric image may be displayed.

US 2009/0123052 A1 discloses tomosynthesis involving acquiring a plurality of tomosynthesis projection images at respective angles relative to the breast, and reconstructing therefrom a plurality of tomosynthesis reconstructed images representative of breast slices which have a predetermined or user-determined thickness. A synthesized 2D image is generated using at least one of the tomosynthesis projection images and/or the tomosynthesis reconstructed images. The synthesized 2D image is advantageously displayed together with tomosynthesis image data at a review workstation.

SUMMARY OF THE INVENTION

It would be advantageous to have an improved system for generating a reconstruction of an object of interest. To better address this concern, in a first aspect, the invention provides a system comprising
 a shape model generator for generating a shape model representing a shape of the object in dependence on a plurality of projections of the object; and
 a reconstructor for reconstructing the object, based on the projections, in dependence on the shape model to obtain a reconstruction of the object.

Because the reconstructor takes the shape model of the object of interest into account, it is enabled to reduce artifacts in the image. The image quality may be improved. Artifacts may occur in a volumetric reconstruction outside the object of interest. This may be due to limitations of the image acquisition and/or reconstruction algorithm used. Using the shape model of the object of interest as prior knowledge in the reconstructor allows a reduction of the artifacts outside the object of interest. Moreover, it may improve the image quality of the reconstruction of the object of interest itself.

The reconstructor may comprise a clipping subsystem for clipping an outside of the object from the reconstruction, based on the shape model. This may effectively delete any artifacts outside the object of interest.

The reconstructor may be arranged for reconstructing only an inside and/or boundary of the object as defined by the shape model. This may reduce the artifacts, and may also improve the computational efficiency, because at least part of the computations relating to an outside of the object may be skipped.

The reconstructor may comprise a back-projection reconstructor arranged for back-projecting the projection images only to voxels of the reconstruction which belong to the inside and/or a boundary region of the object as defined by the shape model. This may improve the computational efficiency of the back-projection.

The reconstructor may comprise
 a soft-tissue reconstructor for generating a reconstruction of soft tissue, based on the plurality of projections; and
 a sparse reconstructor for generating a reconstruction of sparse objects, based on the plurality of projections.

This way, two types of reconstructions are obtained from the same plurality of projections. The sparse objects may be identified and localized in the soft-tissue reconstruction without any segmentation of the soft-tissue reconstruction. This allows inspecting both soft tissue and sparse objects, using the same set of projections. Two reconstructions may be performed, one using a reconstruction algorithm and/or parameters favoring soft tissue, the other using a reconstruction algorithm and/or parameters favoring sparse objects. Consequently, two reconstructions are obtained highlighting different features—soft tissue or sparse objects. Herein, the number of sparse objects and/or the total region occupied by the sparse objects in an examined body part is relatively small. These sparse objects may have a special feature or response, such as a particular attenuation coefficient range, which is used by the sparse reconstructor. The remainder of the image may be relatively homogeneous, for example without said special feature/response or with attenuation values outside the range. Examples include micro-calcifications in a breast or vessels, which may be filled with contrast agent.

The soft-tissue reconstructor may be arranged for performing a back-projection or an iterative reconstruction on the basis of a regularization favoring soft tissue. Such a reconstructor is suitable for performing a reconstruction of soft tissue.

The sparse reconstructor may be arranged for performing an iterative reconstruction on the basis of a regularization which favors sparse objects. Such a reconstructor is suitable for performing a reconstruction of sparse objects.

The system may comprise a reconstruction combiner for combining the soft-tissue reconstruction and the sparse reconstruction into a combined reconstruction showing the soft tissue with enhanced visualization of the sparse objects. This provides an image with improved viewing characteristics. Because the relevant information is combined into a single reconstruction, the time to inspect the reconstruction may be reduced.

The object may comprise at least part of an organ of a subject. This allows reconstructing the object. The boundary of the object, as indicated by the shape model, may comprise skin surface. Such a boundary may have a relatively large step in image gray level, which may be due to a large step of x-ray absorbance. Such a large step may cause artifacts outside the object of interest, which may be reduced or removed using the shape model. For example, the object of interest may comprise at least part of a breast.

Another aspect of the invention provides a medical workstation, comprising the system set forth. Another aspect of the invention provides a medical image acquisition apparatus, comprising a scanner for acquiring projections, and the system set forth. This allows processing and/or viewing the images at the apparatus where the images are acquired.

Another aspect of the invention provides a method of generating a reconstruction of an object of interest, comprising
generating a shape model representing a shape of the object in dependence on a plurality of projections of the object; and
reconstructing the object, based on the projections, in dependence on the shape model to obtain the reconstruction of the object.

Another aspect of the invention provides a computer program product comprising instructions for causing a processor system to perform the method set forth.

It will be appreciated by those skilled in the art that two or more of the above-mentioned embodiments, implementations, and/or aspects of the invention may be combined in any way deemed useful. Elements described regarding the system may also be implemented as a method and/or computer program.

Modifications and variations of the image acquisition apparatus, the workstation, the system, and/or the computer program product, which correspond to the described modifications and variations of the system, can be carried out by a person skilled in the art on the basis of the present description.

A person skilled in the art will appreciate that the method may be applied to multi-dimensional image data, e.g. two-dimensional (2-D), three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention are apparent from and will be elucidated with reference to the drawings. Similar items have been indicated by the same reference numeral.

DETAILED DESCRIPTION OF EMBODIMENTS

Digital breast tomosynthesis (DBTS) may be used to enable early detection of breast cancer. Moreover, findings of smaller tumors than with standard screening mammography may be achieved. However, the amount of data in 3D tomosynthesis is much larger compared to 2D mammography. Therefore, dedicated viewing software is needed, which visualizes the reconstructed 3D breast data in a compact way.

DBTS has the potential to increase sensitivity and/or specificity in breast cancer screening. DBTS may be used for decreasing the false positive rate and/or reduce the need for invasive biopsies. Compared to standard 2D mammography, DBTS provides additional 3D information with good in-plane resolution. The depth resolution may be lower than the in-plane resolution.

Figure 1:
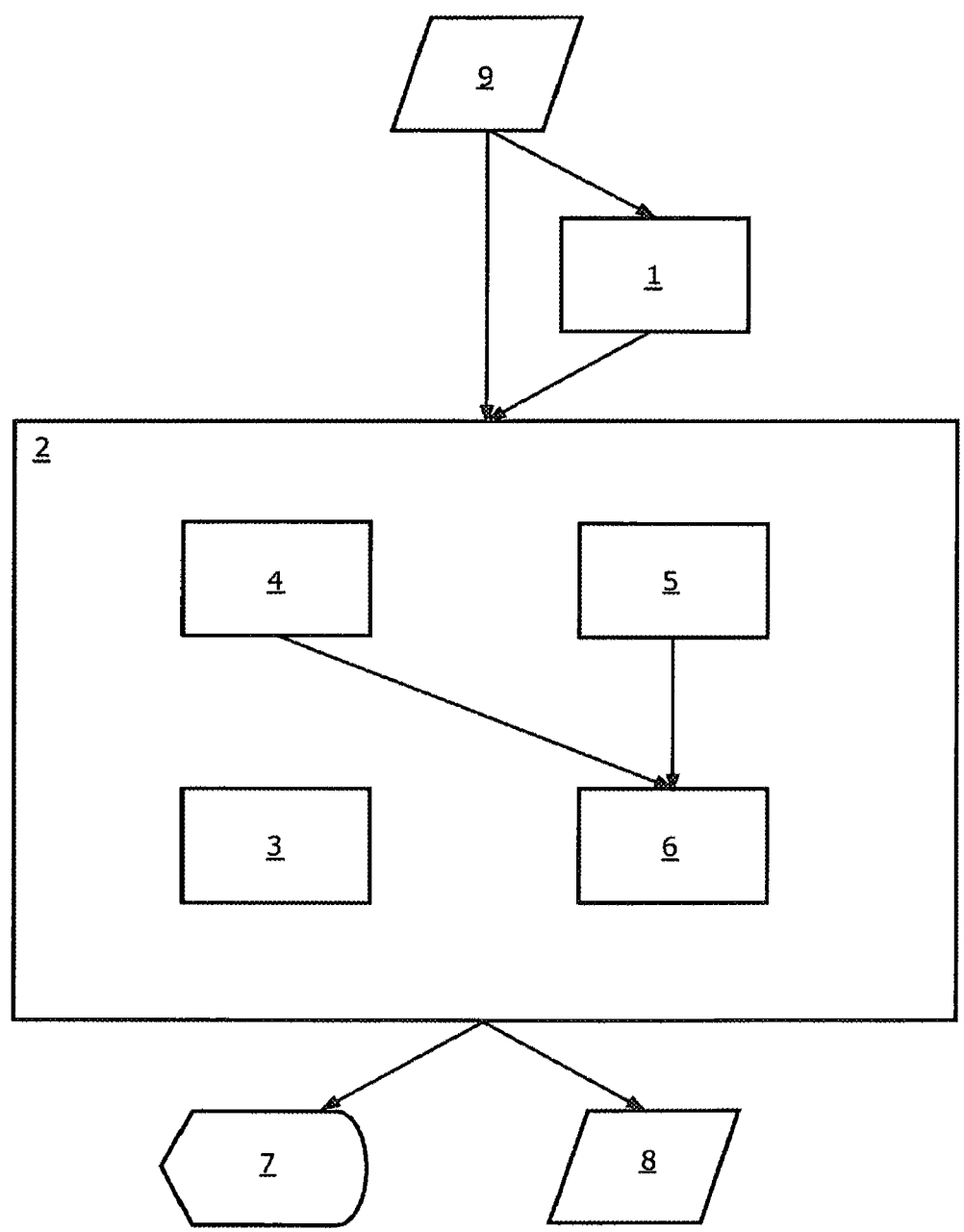
FIG. 1 is a diagram of a system for generating a reconstruction of an object of interest.

FIG. 1 illustrates a system for generating a reconstruction of an object of interest. The system may have access to projections 9 of an object, for example via a data communication and/or storage means. The system may also comprise an image acquisition apparatus for acquiring the projections. The system may comprise a shape model generator 1 for generating a shape model representing a shape of the object. The shape model generator 1 generates the shape model in dependence on the projections of the object. An example of such a shape model generator comprises an examination apparatus as disclosed in WO 2009/083864 of the same applicant. This is an examination apparatus for modeling a polyhedral model of an object of interest, wherein the polyhedral model comprises vertices having coordinates and a topology connecting at least one of the vertices to a face of a surface of the polyhedral model. The examination apparatus comprises a calculation unit arranged for optimizing the coordinates of the polyhedral model and an attenuation function of the polyhedral model during a data reconstruction, resulting in an optimized attenuation value together with a surface model of the object of interest. The surface model resulting from the examination apparatus may be used as the shape model of the object of interest. For example, if the object comprises skin surface, the shape model generator may be arranged for detecting the skin surface in the projections. From this skin surface detected in the projections, at least part of a boundary of the object of interest may be detected.

The system may further comprise a reconstructor 2 for reconstructing the object of interest, based on the projections and in dependence on the shape model, to obtain a reconstruction of the object. The reconstruction of the object may comprise a voxel-based volume reconstruction. Examples of the reconstructor will be provided in the following. The reconstructor 2 may comprise a clipping subsystem 3 for clipping an outside of the object from the reconstruction, based on the shape model. This way, any artifacts outside of the object are removed from the reconstruction. The clipping subsystem may be arranged for setting all voxels outside the object to the same value, for example. A suitable background value may be selected for the voxels outside the object of interest, for example a value which is rendered invisible when the reconstruction is shown on a display. The object of interest may represent an organ of a subject.

The reconstructor 2 may be arranged for reconstructing only an inside and/or a boundary of the object. This inside and/or boundary may be defined by the shape model. For example, if the shape model comprises a surface model, it may have an inside and an outside associated with it. The reconstructor may be arranged for skipping any area of the reconstruction outside of the object. For example, any voxels outside of the object of interest may be skipped during the reconstruction computations. Only reconstructed values for voxels within the object and/or on the object boundary are processed to compute a gray value for them. The voxels outside the object may be set to a default value.

The reconstructor 2 may comprise a back-projection reconstructor arranged for back-projecting the projection images. This back-projection may be limited to voxels of the reconstruction which belong to the inside and/or the boundary region of the object as defined by the shape model.

The reconstructor 2 may comprise a soft-tissue reconstructor 4 for generating a reconstruction favoring soft tissue, based on the plurality of projections. The reconstructor 2 may also comprise a sparse reconstructor 5 for generating a reconstruction of sparse objects, based on the plurality of projections. The reconstructor 2 may comprise either one of reconstructors 4 and 5, or both. Either or both may be arranged for reconstructing only the inside and/or boundary of the object of interest. The reconstructor 2 may be arranged for applying both reconstructors 4 and 5 to the same set of projections. This may result in two reconstructions, a soft-tissue reconstruction and a sparse reconstruction, which may be visualized, for example simultaneously (one beside the other) or one after the other, for example on display 7. The sparse objects may be, for example, objects associated with a high x-ray attenuation coefficient, such as micro-calcifications or vessels filled with contrast agent. However, this is not a limitation. The sparse objects are sparsely distributed in the projections and/or reconstruction and may be distinguishable by a special property that is common to the sparsely distributed objects.

The reconstructor 2 may further comprise a reconstruction combiner 6 for combining the soft-tissue reconstruction and the sparse reconstruction into a combined reconstruction in which the soft tissue from the soft-tissue reconstruction is enhanced with a representation of the sparse objects from the sparse reconstruction. For example, the sparse objects represented by the sparse reconstruction are segmented and the corresponding voxels of the soft-tissue reconstruction are replaced by the segmented sparse objects.

The soft-tissue reconstructor 4 may be arranged for performing a back-projection or an iterative reconstruction on the basis of a regularization favoring soft tissue. The sparse reconstructor 5 may be arranged for performing an iterative reconstruction on the basis of a regularization which favors sparse objects.

The reconstruction or reconstructions generated by the reconstructor 2 may be visualized using a display 7. They may also be stored on a storage medium 8. It is also possible to transmit the results to another entity via a communications port and/or network. For example, the reconstruction(s) may be transmitted to a remote image repository.

The system may be incorporated into a medical workstation. Such a medical workstation may have a network connection for receiving projections and/or transmitting reconstructions. Moreover, the medical workstation may comprise a display for displaying the reconstructions created by the system. The medical workstation may also comprise a user interface for enabling an operator to control the system. The system may also be incorporated in a medical image acquisition apparatus. A functionality similar to that provided in the medical workstation may also be provided by the medical image acquisition apparatus. The medical image acquisition apparatus may further comprise a scanner for acquiring the projections of the object of interest. An example scanner comprises an x-ray tomosynthesis mammography scanner.

Figure 2:
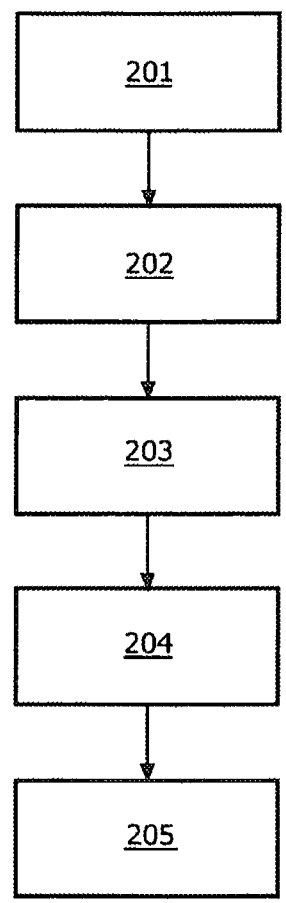
FIG. 2 is a flow chart showing steps of a method of generating a reconstruction of an object of interest.

FIG. 2 shows a flow chart illustrating a method of generating a reconstruction of an object of interest. In step 201, a plurality of projections are made available, for example by receiving them from an image repository such as a PACS system, or by performing an image acquisition on a subject. In step 202, a shape model is generated. The shape model may represent a shape of the object. This shape model is generated in dependence on a plurality of projections of the object, as set forth. In step 203, the object may be reconstructed based on the projections and in dependence on the shape model. This way, a reconstruction of the object may be obtained. In step 204, the reconstruction may be visualized or printed. In step 205, the reconstruction may be stored or sent to an image repository. The method may be implemented in form of a computer program product comprising instructions for causing a processor system to perform the method. The computer program product may be stored on or transmitted via a medium.

The reconstructions set forth may be displayed on a viewing console for DBTS. The viewing console may enable the visualization of simulated mammograms, which are generated from a reconstruction. Additionally, a slab view representation of the data may be provided with both automatic and interactive selection of suspicious slabs. The viewing console may provide 3D tomosynthesis reconstruction of a series of 2D projection images, acquired on a tomosynthesis-capable digital mammography system. In addition to a standard filtered back-projection reconstruction, micro-calcifications may be selectively reconstructed using a dedicated iterative algorithm. Artifacts may be reduced in the way set forth, and contrast may be enhanced, using modeling and digital imaging techniques. Forward projection of artifact-reduced and contrast-enhanced 3D reconstruction into a series of projection views, which may include standard CC and MLO views, may be performed. These projection views are hereinafter referred to as simulated mammograms. Simulated mammograms may be displayed in a cine loop, which may improve the visual discrimination of lesions and overlaying tissue. Additionally, the directly measured projections may be displayed in a cine loop, too. Integrated CAD software may be employed to detect lesions and calcifications in the tomosynthesis data, which may then be highlighted as projection overlay onto the simulated mammograms. Interactive selection of 3D slice views from CAD overlay on simulated mammograms may be supported. It is also possible to enable marking suspicious regions in at least two simulated mammograms, manually. An interactive calcification map may be displayed, for example based on the sparse reconstruction set forth. This may enable the user to select calcified regions in order to view corresponding reconstructed slices.

Figure 3:
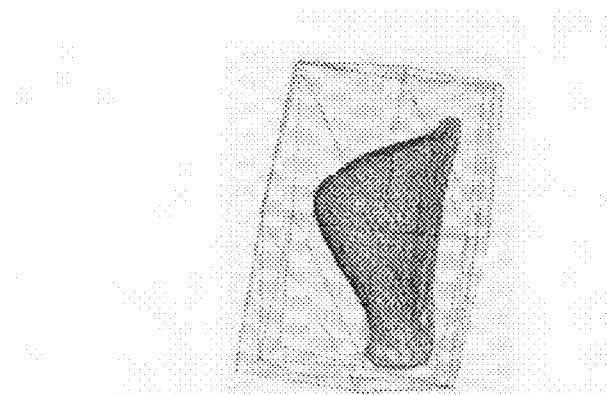
FIG. 3 is an illustration of a surface model of a female breast.
Figure 4:
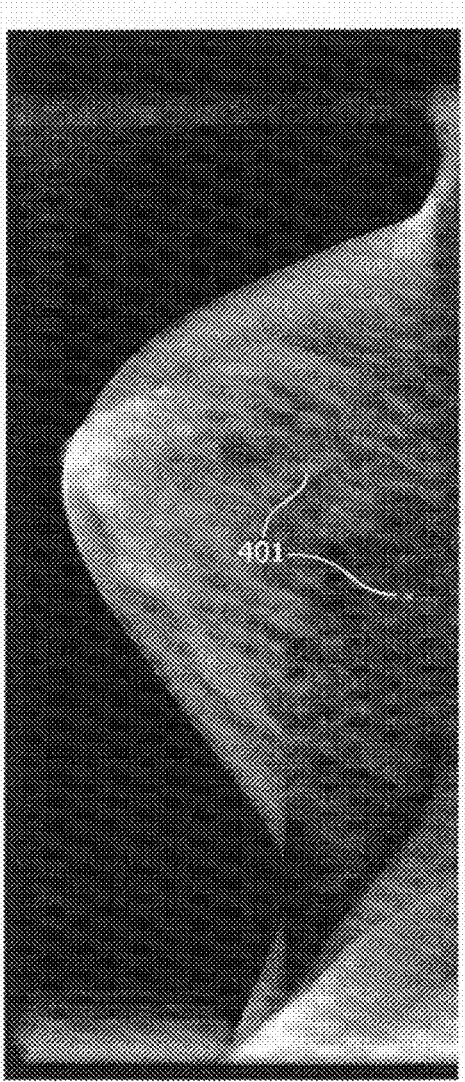
FIG. 4 shows a simulated mammogram in central view.
Figure 5:
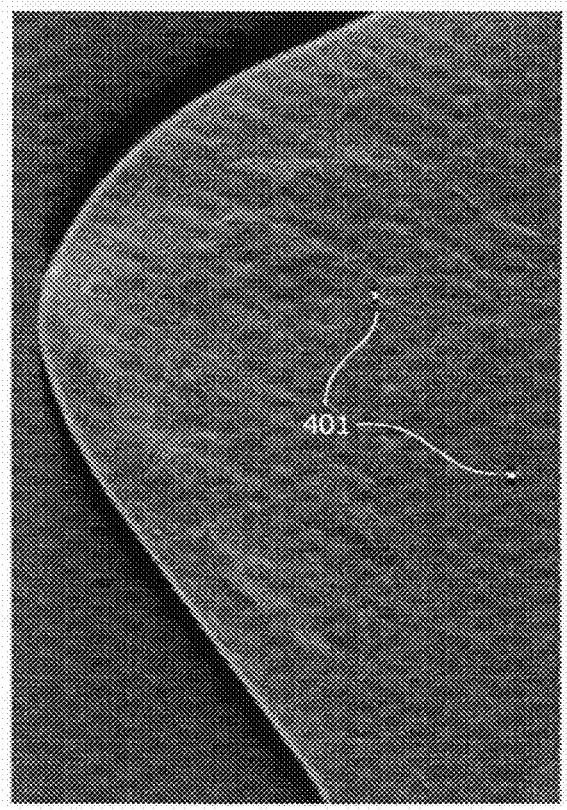
FIG. 5 shows a reconstructed tomosynthesis slice showing calcifications, after digital post-processing.

FIG. 3 is an illustration of a shape model of an object of interest. In this case, the object of interest is a female breast. The Figure shows a surface mesh describing the outer surface of the breast of a patient. This surface mesh was generated from a number of x-ray projection images of the breast, using the system set forth. FIG. 4 illustrates a simulated x-ray image of a tomosynthesis reconstructed breast image. Two bright dots 401 indicate micro-calcifications. FIG. 5 illustrates a slice of this tomosynthesis reconstructed breast image showing the two micro-calcifications 401.

In DBTS, a series of 2D X-ray projections of the breast are acquired over a relatively small angular range, usually less than 90 degrees. Using filtered back projection or iterative reconstruction techniques, a 3D image of the breast may be obtained. See FIG. 5 for an illustration of a slice of such a 3D image. Due to the limited angular range, 3D tomosynthesis reconstructions may be affected by strong artifacts, which can be observed for example at the breast shape boundary.

In order to reduce these artifacts, a boundary model of the breast may be fitted to the projection data. See FIG. 3 for an example. Then the voxel values outside the breast model may be set to zero. Alternatively, image post-processing methods such as segmentation, filtering, transformation, model deformation and combinations thereof can be applied to reduce these artifacts, resulting in a post-processed corrected image.

To maintain the common mammography view for the radiologist, the post-processed image may be forward projected into the acquisition geometry. An example simulated mammogram is shown in FIG. 4. The simulated mammograms may be shown in cine mode on a viewing console. Optionally, the measured projections can be displayed also in this panel of the viewing console. By viewing the simulated mammograms and the measured projections in a cine loop, overlaying structures become more visible since the distance of an object from the detector (depth inside breast) relates to the amount of motion of the forward projected structure during the cine loop.

Furthermore, calcifications may be selectively reconstructed using an iterative reconstruction algorithm that favors sparse objects. Then, the reconstructed calcifications may be displayed in another panel on the viewing console, e.g. as a calcification map. Applying CAD tools to either one or both of the soft-tissue reconstruction and the sparse reconstruction may yield potentially cancerous tissue regions. These regions may be marked on the simulated mammograms or on the calcification map. The radiologist may be enabled to select a suspicious region either on the calcification map or on the simulated mammograms. The corresponding slice may be automatically displayed on the console. The selected tissue region, found by the CAD tool, may be highlighted in the same color on several displays. An additional high-resolution magnified view of the tissue region may be shown in another panel.

A sparse reconstruction may be obtained in the following way (see also WO 2008/107816 A1 of the same applicant). Other ways to obtain a sparse reconstruction are also possible. Regarding the acquisition protocol, for example using a digital mammography system, a sequence of X-ray projection images may be acquired. For example, a number of projections are recorded while the X-ray source moves through an angle of less than 90 degrees. However, this is not a limitation. A background-removal filter may be applied to the projections, which retains the sparse objects, e.g. micro-calcifications, and reduces the projection background. One possible filter is a morphological top-hat filter. A 3D reconstruction of the sparse objects, e.g. micro-calcifications, may be performed. A specialized iterative algorithm can be applied here, which favors spatially sparse images. Since the sparse objects cover only a very small fraction of the reconstruction volume, they constitute a spatially sparse object. In the iterative reconstruction algorithm, prior knowledge about the likely location of the sparse objects (such as calcifications or vessels) can be introduced. In the case of calcifications, this knowledge can be obtained by filtering the projections with a calcification detection filter. The 3D reconstruction may be presented to the user. Detection and diagnostic assessment of e.g. microcalcification clusters in 3D can then be performed, with or without the assistance of a CAD (Computer Assisted Diagnosis) system. A 3D reconstruction of the soft tissue can be performed with a method as described in, for example, E. Sidky et al., Proc. SPIE vol. 6510, p. 651027, 2007. By fusing the soft tissue and the micro-calcification reconstructions the diagnostic information of both datasets can be jointly presented to the user.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a floppy disc or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or being used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for generating a reconstruction of an object of interest, comprising;
   a shape model generator generating a shape model that defines a shape of the object in dependence on a plurality of projections of the object; and
   a volume reconstructor reconstructing the object, based on the plurality of projections, in dependence on the definition of the shape from the shape model to obtain the reconstruction of the object, wherein the volume reconstructor is arranged for reconstructing only an inside of the object as defined by the shape model and wherein the volume reconstructor comprises:
      a soft-tissue reconstructor generating a reconstruction favoring only soft tissue, based on the plurality of projections; and
      a sparse reconstructor generating a reconstruction of sparse objects, based on the plurality of projections.

2. The system according to claim 1, wherein the volume reconstructor comprises a clipping subsystem for clipping an outside of the object from the reconstruction of the object, based on the shape model.

3. The system according to claim 1, wherein the volume reconstructor comprises a back-projection reconstructor arranged for back-projecting the projection images only to voxels of the reconstruction of the object which belong to the inside of the object as defined by the shape model.

4. The system according to claim 1, wherein the soft-tissue reconstructor is arranged for performing a back-projection or an iterative reconstruction on the basis of a regularization favoring soft tissue, or the sparse reconstructor is arranged for performing an iterative reconstruction on the basis of a regularization which favors sparse objects.

5. The system according to claim 1, wherein the volume reconstructor further comprises a reconstruction combiner for combining the soft-tissue reconstruction and the sparse reconstruction into a combined reconstruction showing the soft tissue with enhanced visualization of the sparse objects.

6. The system according to claim 1, wherein the object comprises at least part of an organ of a subject.

7. The system according to claim 6, wherein the object further comprises skin surface.

8. A medical workstation, comprising the system according to claim 1.

9. A medical image acquisition apparatus, comprising a scanner for acquiring projections, and the system according to claim 1.

10. A method of generating a reconstruction of an object of interest, comprising:
    generating a shape model that defines a shape of the object in dependence on a plurality of projections of the object; and
    reconstructing the object, based on the plurality of projections, in dependence on the definition of the shape from the shape model to obtain the reconstruction of the object, wherein a volume reconstructor is arranged for reconstructing only an inside of the object as defined by the shape model and wherein the reconstructor comprises;
        generating a reconstruction favoring only soft tissue, based on the plurality of projections; and
        generating a reconstruction of sparse objects, based on the plurality of projections.

11. A computer program product comprising executable instructions embodied on a non-transitory computer readable storage medium that, when executed by a processor system, cause the processor system to perform a method of generating a reconstruction of an object of interest, the method comprising:
    generating a shape model that defines a shape of the object in dependence on a plurality of projections of the object; and
    reconstructing the object, based on the plurality of projections, in dependence on the definition of the shape from the shape model to obtain the reconstruction of the object, wherein a volume reconstructor is arranged for reconstructing only an inside of the object as defined by the shape model and wherein the reconstructing comprises;
        generating a reconstruction favoring only soft tissue, based on the plurality of projections; and
        generating a reconstruction of sparse objects, based on the plurality of projections.

* * * * *